US011953307B2

(12) United States Patent
Irino et al.

(10) Patent No.: US 11,953,307 B2
(45) Date of Patent: Apr. 9, 2024

(54) MEASURING APPARATUS

(71) Applicant: DMG MORI CO., LTD., Nara (JP)

(72) Inventors: Naruhiro Irino, Nara (JP); Masahiro Shimoike, Nara (JP)

(73) Assignee: DMG MORI CO., LTD., Nara (JP)

( * ) Notice: Subject to any disclaimer, the term of this patent is extended or adjusted under 35 U.S.C. 154(b) by 205 days.

(21) Appl. No.: 17/623,828

(22) PCT Filed: Jul. 10, 2020

(86) PCT No.: PCT/JP2020/026961
§ 371 (c)(1),
(2) Date: Dec. 29, 2021

(87) PCT Pub. No.: WO2021/010305
PCT Pub. Date: Jan. 21, 2021

(65) Prior Publication Data
US 2022/0244037 A1   Aug. 4, 2022

(30) Foreign Application Priority Data
Jul. 16, 2019   (JP) .................... 2019-131240

(51) Int. Cl.
G01B 11/00 (2006.01)
G01B 11/03 (2006.01)
G06T 7/70 (2017.01)

(52) U.S. Cl.
CPC ........... *G01B 11/002* (2013.01); *G01B 11/03* (2013.01); *G06T 7/70* (2017.01); *G06T 2207/30164* (2013.01)

(58) Field of Classification Search
CPC .............. B23Q 17/2428; B23Q 17/249; G01B 11/002; G01B 11/03; G05B 19/401;
(Continued)

(56) References Cited

U.S. PATENT DOCUMENTS 9,329,029 B2   5/2016   Kurahashi
9,659,363 B2   5/2017   Ogawa
(Continued)

FOREIGN PATENT DOCUMENTS

CN   103189712 A   7/2013
CN   105881102 A   8/2016
(Continued)

OTHER PUBLICATIONS

International Search Report and Written Opinion dated August 4, 2020 for Application No. PCT/JP2020/026981.
(Continued)

*Primary Examiner* — Peter B Kim
(74) *Attorney, Agent, or Firm* — DiPerna Law Firm, P.C.

(57) ABSTRACT

A measuring apparatus for measuring a planar relative motion between a tool attacher and a work attacher of a machine tool includes at least one image capturing element capable of performing image capturing at a first position, a second position, and a third position, which are not located on the same line. The image capturing elements at the first position, the second position, and the third position are caused to capture a first point, a second point, and a third point, respectively, arranged on at least one plane of an XY-plane, an XZ-plane, and a YZ-plane. The image capturing element at the second position and the image capturing element at the third position are caused to capture the first point, the image capturing element at the first position and the image capturing element at the third position are caused to capture the second point, and the image capturing element at the first position and the image capturing element at the second position are caused to capture the third point. Based on the image capturing result, a value indicating the planar relative motion between the tool attacher and the work attacher is calculated.

7 Claims, 7 Drawing Sheets

(58) Field of Classification Search
CPC ........... G05B 2219/37572; G05B 2219/50022; G05B 2219/50122; G05B 2219/50252; G06T 2207/30164; G06T 7/70; H01L 21/67259

See application file for complete search history.

(56) References Cited

U.S. PATENT DOCUMENTS

| | | | |
|---|---|---|---|
| 2004/0129756 | A1 | 7/2004 | Zakel et al. |
| 2010/0030347 | A1 | 2/2010 | Shindo |
| 2012/0062708 | A1 | 3/2012 | Johnson et al. |
| 2014/0288710 | A1 | 9/2014 | Ikenaga et al. |
| 2016/0239013 | A1* | 8/2016 | Troy .................... B25J 9/1664 |
| 2019/0172742 | A1 | 6/2019 | Mochizuki |

FOREIGN PATENT DOCUMENTS

| | | |
|---|---|---|
| CN | 106346315 A | 1/2017 |
| CN | 106863014 A | 6/2017 |
| CN | 108340211 A | 7/2018 |
| EP | 2122422 B1 | 9/2010 |
| JP | 2010256828 A | 11/2010 |
| JP | 2012049621 A | 3/2012 |
| JP | 2012101289 A | 5/2012 |
| JP | 2014041014 A | 3/2014 |
| JP | 2016100565 A | 5/2016 |
| JP | 2016147346 A | 8/2016 |
| JP | 2019-102728 A | 6/2019 |

OTHER PUBLICATIONS

Extended European Search Report dated Jun. 2, 2022, in European Patent Application No. 20840738.7, 9 pages.

First Office Action dated Mar. 31, 2023, in Chinese Patent Application No. 202080047917.0, with an English machine translation thereof, 16 pages.

Notice of Allowance for corresponding Chinese Patent Application No. 202080047917.0 dated Feb. 4, 2024.

* cited by examiner

MEASURING APPARATUS

RELATED APPLICATIONS

This application is an application under 35 U.S.C. 371 of International Application No. PCT/JP2020/026961 filed on Jul. 10, 2020, the entire contents of which are incorporated herein by reference.

This application is based upon and claims the benefit of priority from Japanese patent application No. 2019-131240, fled on Jul. 16, 2019, the disclosure of which is incorporated herein in its entirety by reference.

TECHNICAL FIELD

The present invention relates to a measuring apparatus.

BACKGROUND ART

In the above technical field, patent literature 1 discloses a technique of calculating a deviation amount by comparing the position of a feature point of a work detected from an image captured by an image capturer and a reference point image position and creating a correction amount for setting the deviation amount to zero.

CITATION LIST

Patent Literature

Patent literature 1: Japanese Patent Laid-Open No. 2016-147346

SUMMARY OF THE INVENTION

Technical Problem

However, in the technique described in the above literature, it is impossible to measure the relative motion between a tool attacher and a work attacher.

The present invention enables to provide a technique of solving the above-described problem.

Solution to Problem

One example aspect of the invention provides a measuring apparatus for measuring a planar relative motion between a tool attacher and a work attacher of a machine tool, comprising:
  an image capturer that includes at least one image capturing element capable of performing image capturing at a first position, a second position, and a third position, which are not located on the same line, in a state in which the image capturer is attached to one of the tool attacher and the work attacher, any one of the first position, the second position, and the third position being not located on a line that passes through remaining two;
  an image capturing controller that causes the image capturing elements at the first position, the second position, and the third position to capture a first point, a second point, and a third point, respectively, arranged on at least one plane of an XY-plane, an XZ-plane, and a YZ-plane without changing a relative position of one of the tool attacher and the work attacher to which the image capturer is attached, and changes the relative position of one of the tool attacher and the work attacher, causes the image capturing element at the second position and the image capturing element at the third position to capture the first point, causes the image capturing element at the first position and the image capturing element at the third position to capture the second point, and causes the image capturing element at the first position and the image capturing element at the second position to capture the third point; and
  a calculator that calculates a value indicating the planar relative motion between the tool attacher and the work attacher based on an image capturing result of the image capturer.

Another example aspect of the invention provides a measuring apparatus for measuring a planar relative motion between a tool attacher and a work attacher of a machine tool including:
  the tool attacher to which a tool is attached;
  the work attacher to which a work is attached;
  an image capturer that includes at least one image capturing element capable of performing image capturing at a first position, a second position, and a third position any one of which is not located on a line that passes through remaining two in a state in which the image capturer is attached to one of the tool attacher and the work attacher;
  an image capturing controller that causes, in accordance with a measuring program, the image capturing elements at the first position, the second position, and the third position to capture a first point, a second point, and a third point, respectively, arranged on at least one plane of an XY-plane, an XZ-plane, and a YZ-plane without changing a relative position of one of the tool attacher and the work attacher to which the image capturer is attached, changes the relative position of one of the tool attacher and the work attacher, causes the image capturing element at the second position and the image capturing element at the third position to capture the first point, causes the image capturing element at the first position and the image capturing element at the third position to capture the second point, and causes the image capturing element at the first position and the image capturing element at the second position to capture the third point; and
  a calculator that calculates a value indicating the planar relative motion between the tool attacher and the work attacher based on an image capturing result of the image capturer,
  the measuring apparatus comprising:
  a storage unit that stores the measuring program;
  a transmitter that transmits the measuring program to the machine tool; and
  a display unit that displays the value calculated by the calculator.

Advantageous Effects of Invention

According to the present invention, it is possible to measure the relative motion between a tool attacher and a work attacher.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A measuring apparatus 100 according to the first example embodiment of the present invention will be described with reference to FIG. 1. The measuring apparatus 100 is an apparatus that measures the planar relative motion between a tool attacher 110 and a work attacher 120 of a machine tool 150.

Figure 1:
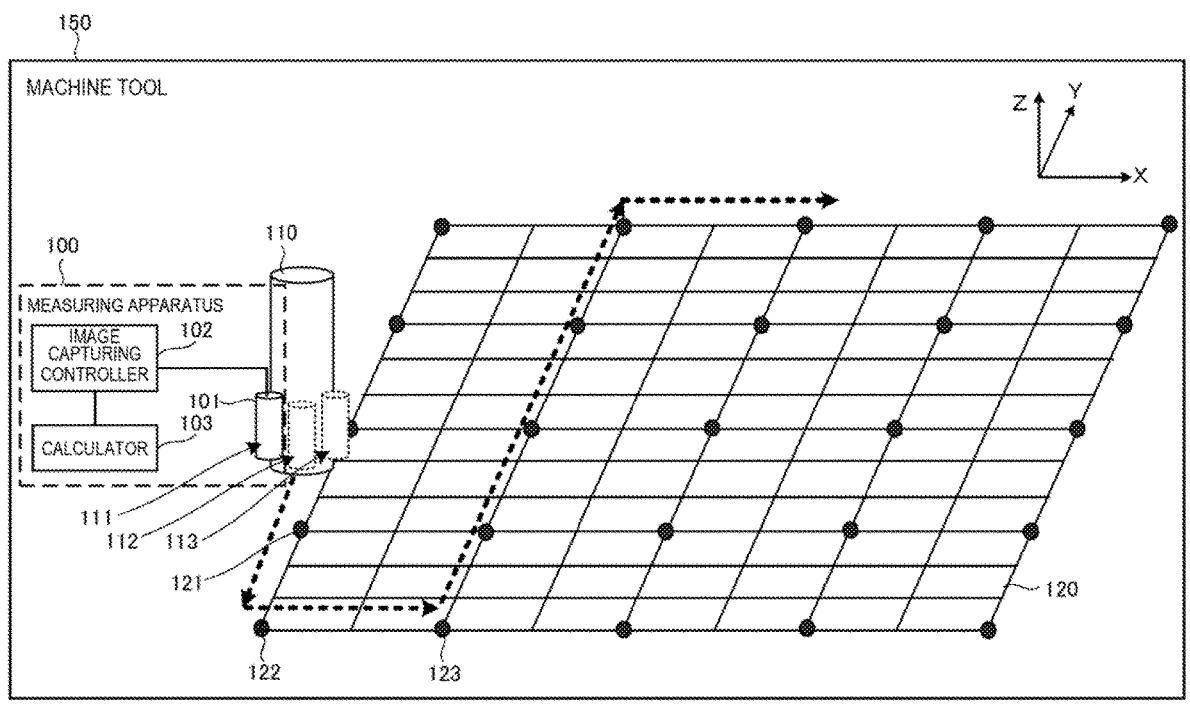
FIG. 1 is a block diagram for explaining the configuration of a measuring apparatus according to the first example embodiment of the present invention.

As shown in FIG. 1, the measuring apparatus 100 includes an image capturer 101, an image capturing controller 102, and a calculator 103. The image capturer 101 includes at least one image capturing element capable of performing image capturing at a first position 111, a second position 112, and a third position 113, which are not located on the same line, in a state in which the image capturer 101 is attached to the tool attacher 110 or the work attacher 120. Any one of the first position 111, the second position 112, and the third position 113 is not located on a line that passes through the remaining two.

The image capturing controller 102 causes the image capturing elements at the first position 111, the second position 112, and the third position 113 to capture a first point 121, a second point 122, and a third point 123, respectively, arranged on at least one plane of an XY-plane, an XZ-plane, and a YZ-plane without changing the relative position of the tool attacher 110 or the work attacher 120 to which the image capturer 101 is attached. The image capturing controller 102 changes the relative position of the tool attacher 110 or the work attacher 120, causes the image capturing element at the second position 112 and the image capturing element at the third position 113 to capture the first point 121, causes the image capturing element at the first position 111 and the image capturing element at the third position 113 to capture the second point 122, and causes the image capturing element at the first position 111 and the image capturing element at the second position 112 to capture the third point 123. Based on the image capturing result of the image capturer 101, the calculator 103 calculates a value indicating the planar relative motion between the tool attacher 110 and the work attacher 120.

According to this example embodiment, since an image capturing element captures a point on a plane at each of the first position, the second position, and the third position, any one of which is not located on a line that passes through the remaining two, the planar relative motion between the tool attacher and the work attacher can accurately be measured.

Second Example Embodiment

Figure 2:
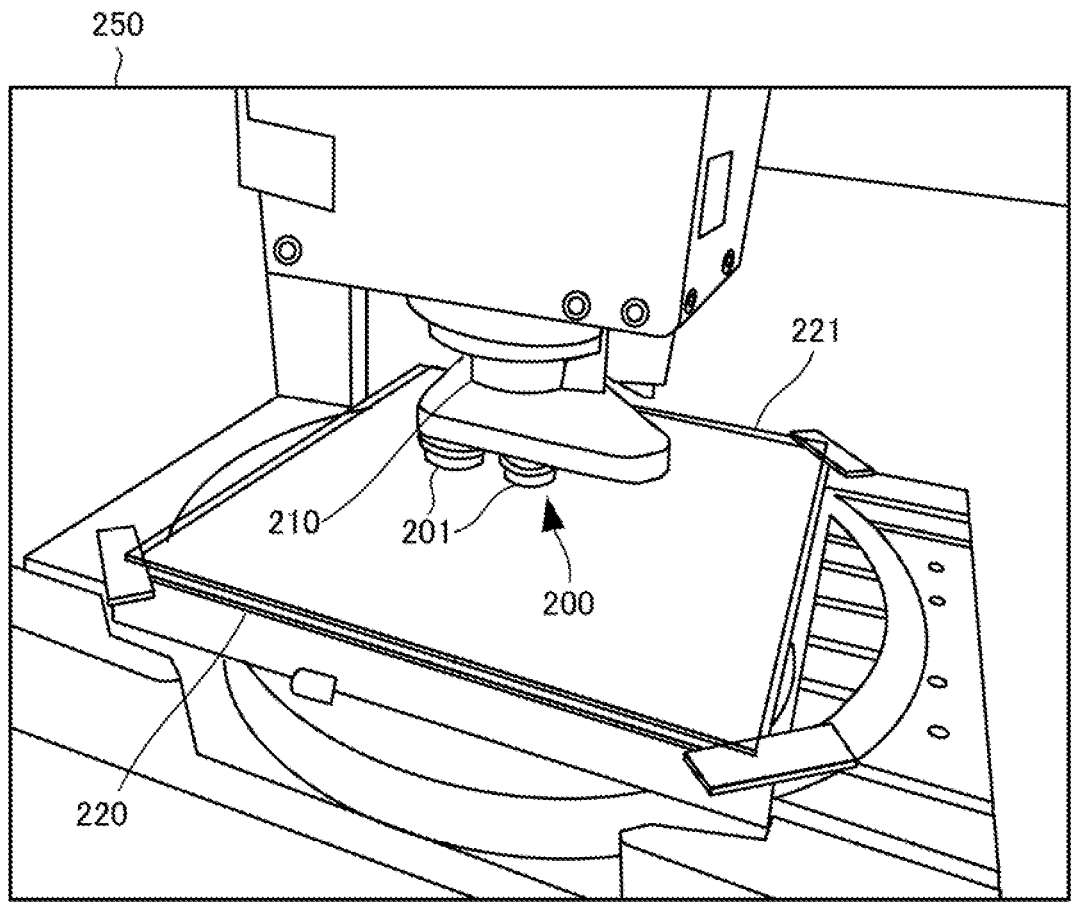
FIG. 2 is a view for explaining the outline of the configuration of a measuring apparatus according to the second example embodiment of the present invention.

A measuring apparatus according to the second example embodiment of the present invention will be described next with reference to FIGS. 2 to 4B. FIG. 2 is a view for explaining the outline of the measuring apparatus according to this example embodiment. A measuring apparatus 200 measures the planar relative motion between a tool attacher 210 and a work attacher 220 of a machine tool 250. The measuring apparatus 200 includes an image capturer 201. Based on the image capturing result of the image capturer 201, the measuring apparatus 200 calculates a value indicating the planar relative motion between the tool attacher 210 and the work attacher 220. Note that FIG. 2 shows an example in which a transparent glass plate 221 is arranged on the work attacher 220. Grid lines (not shown) are drawn on the glass plate 221. The measuring apparatus 200 causes the image capturer 201 to capture a predetermined position, for example, a grid point on the glass plate 221, thereby measuring the relative motion.

Figure 3:
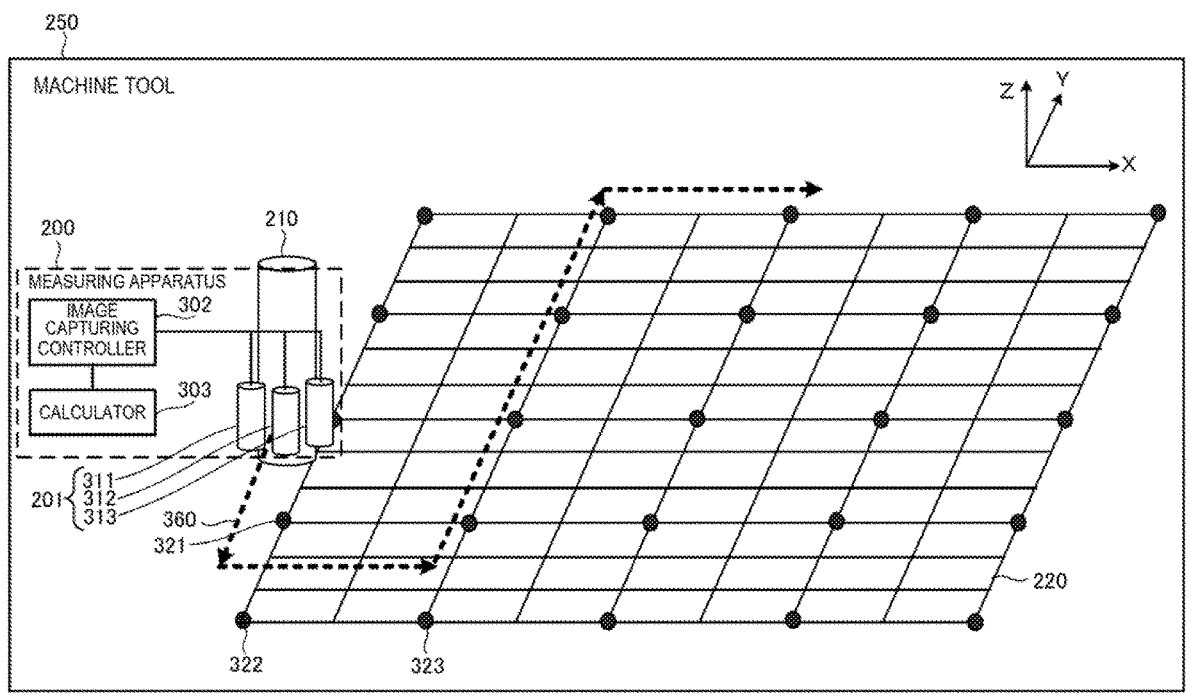
FIG. 3 is a block diagram for explaining the configuration of the measuring apparatus according to the second example embodiment of the present invention.

FIG. 3 is a block diagram for explaining the configuration of the measuring apparatus 200 according to this example embodiment. The measuring apparatus 200 includes the image capturer 201, an image capturing controller 302, and a calculator 303. The image capturer 201 includes at least one image capturing element capable of performing image capturing at a first position, a second position, and a third position, which are not located on the same line in a state in which the image capturer 201 is attached to the tool attacher 210 or the work attacher 220. Note that an example in which the image capturer 201 is attached to the tool attacher 210 is shown here. The image capturer 201 includes three cameras 311, 312, and 313 as the at least one image capturing element. In the measuring apparatus 200, the image capturer 201, the image capturing controller 302, and the calculator 303 form one unit. Even the existing machine tool 250 can use the measuring apparatus 200 when the measuring apparatus 200 according to this example embodiment is attached to the machine tool 250. Also, the measuring apparatus 200 may be incorporated in the machine tool 250 in advance. Note that the tool attacher (spindle) 210 is controlled by a spindle controller (not shown). The spindle controller controls the spindle based on a command from the image capturing controller 302. The operation of the tool attacher 210 is controlled such that it synchronizes with the operation of the image capturer 201. The description has been made here using an example in which the three cameras 311, 312, and 313 are provided as the at least one image capturing element. The number of cameras may be two or four or more.

Figure 4A:
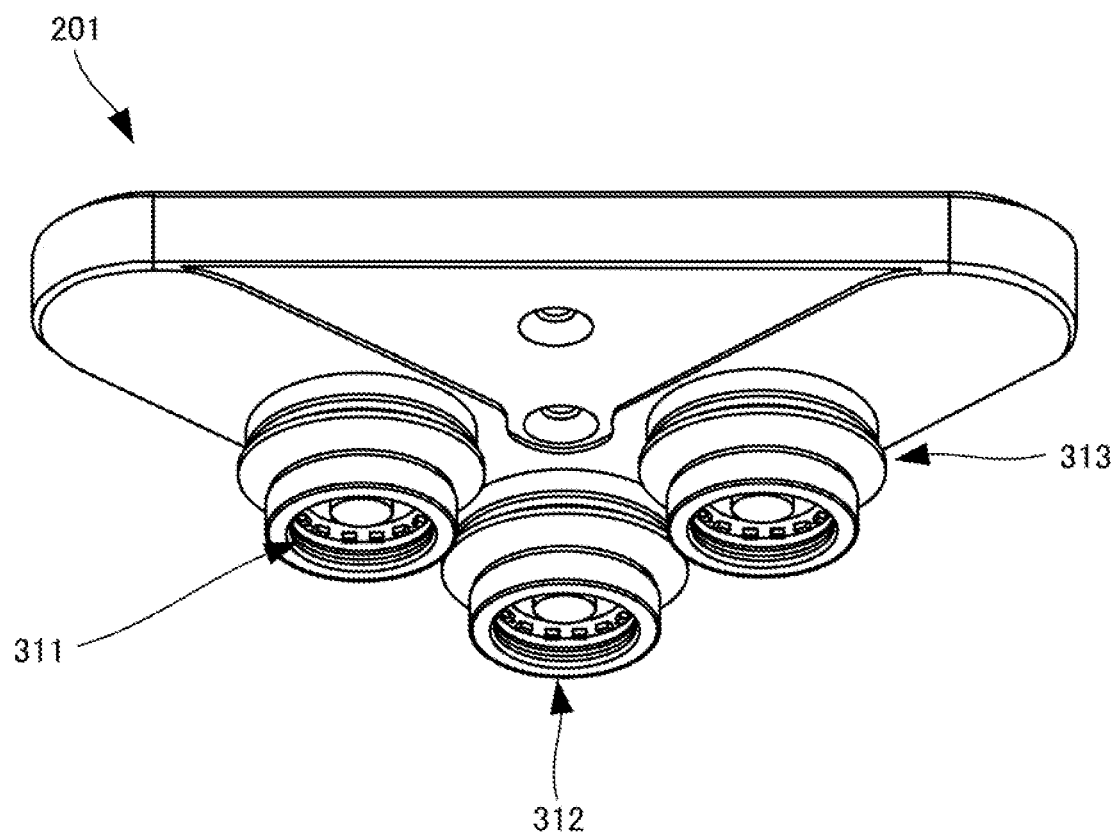
FIG. 4A is a perspective view, viewed from a bottom surface side, for explaining the image capturer of the measuring apparatus according to the second example embodiment of the present invention.

The arrangement positions of the three cameras 311, 312, and 313 will be described here with reference to FIGS. 4A and 4B. FIG. 4A is a perspective view, viewed from a bottom surface side, for explaining the image capturer of the measuring apparatus according to this example embodiment.

Figure 4B:
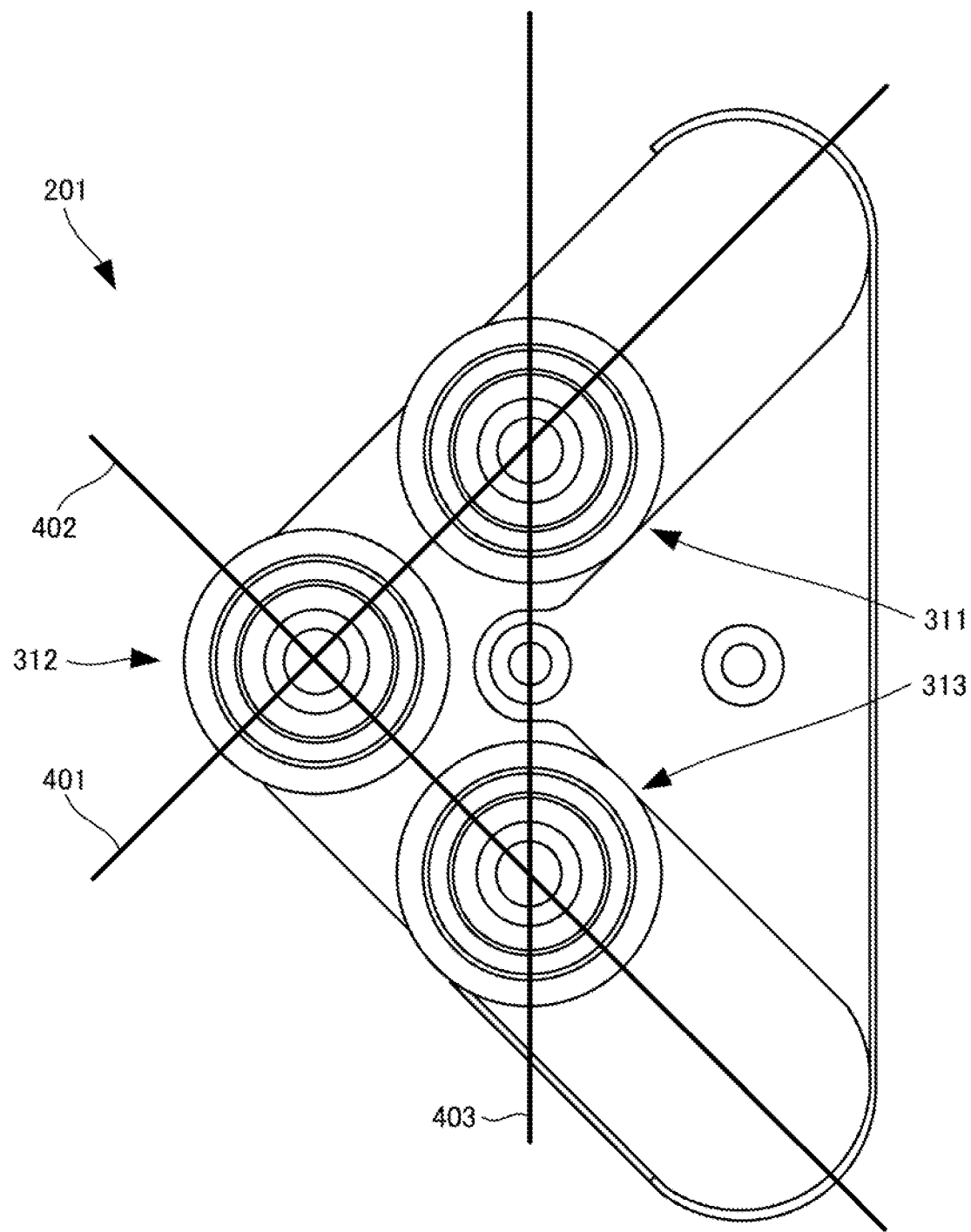
FIG. 4B is a bottom view for explaining the image capturer of the measuring apparatus according to the second example embodiment of the present invention.

FIG. 4B is a bottom view for explaining the image capturer of the measuring apparatus according to this example embodiment.

The three cameras 311, 312, and 313 are arranged in an L-shaped pattern. With this arrangement, as for the arrangement positions of the three cameras, any one of the three cameras is not located on a line that passes through the remaining two. For example, the camera 311 is arranged at the first position, the camera 312 is arranged at the second position, and the camera 313 is arranged at the third position. The cameras 311, 312, and 313 can perform image capturing at the first position, the second position, and the third position, respectively. Note that the arrangement positions of the cameras 311, 312, and 313 are not limited to the example shown here.

Here, referring to FIG. 4B, the cameras 311 and 312 are arranged on a line 401, but the camera 313 is not located on the line 401. The cameras 312 and 313 are arranged on a line 402, but the camera 311 is not located on the line 402. The cameras 311 and 313 are arranged on a line 403, but the camera 312 is not located on the line 403. That is, any one of the first position, the second position, and the third position is not located on a line that passes the remaining two. In FIG. 4B, as an example of the arrangement, the cameras 311 to 313 are arranged at the vertices of a right-angled isosceles triangle, respectively. However, the present invention is not limited to this, and, for example, one camera may be arranged at each vertex of an isosceles triangle, at each vertex of an equilateral triangle, or at each vertex of another triangle. With this arrangement, two directions, for example, an X direction and a Y direction can be created. Hence, two directions can be captured using three cameras.

The image capturing controller 302 first causes the camera 311 at the first position, the camera 312 at the second position, and the camera 313 at the third position to capture a first point 321, a second point 322, and a third point 323, respectively, arranged on an XY-plane without changing the relative position between the tool attacher 210 to which the image capturer 201 is attached and the work attacher 220. Note that the work attachment surface of the work attacher 220 is defined as the XY-plane.

Then, the image capturing controller 302 moves the tool attacher 210 along an arrow 360, thereby changing the relative position between the tool attacher 210 and the work attacher 220. That is, the image capturing controller 302 moves the tool attacher 210 located above the first point 321 to, for example, a position above the second point 322 along the arrow.

When the movement of the tool attacher 210 is completed, the image capturing controller 302 causes the cameras 312 and 313 to capture the first point 321, causes the cameras 311 and 313 to capture the second point, and causes the cameras 311 and 312 to capture the third point. In this way, the image capturing controller 302 causes the cameras 311, 312, and 313 to capture the points 321, 322, and 323 while changing the position of the tool attacher 210.

Based on the image capturing result of the image capturer 201, the calculator 303 calculates a value indicating the planar relative motion between the tool attacher 210 and the work attacher 220. That is, the three points 321, 322, and 323 of the work attacher 220 are captured using the three cameras 311, 312, and 313, thereby detecting a deviation and measuring the planar relative motion between the tool attacher 210 and the work attacher 220.

Note that although the first point 321, the second point 322, and the third point 323 are points on the work attacher 220 here, a grid representing the first point 321, the second point 322, and the third point 323 may be used (glass plate 221). As the grid, for example, grid-shaped lines are formed by drawing a plurality of orthogonal lines on a flat plate containing transparent glass, plastic, resin, or the like, and the intersections are defined as the first point 321, the second point 322, the third point 323, and the like. Note that the material of the grid is not limited to glass or a plastic resin, the grid is not limited to a transparent material, and the grid-shaped lines are not limited to orthogonal lines. The first point 321, the second point 322, and the third point 323 are not fixed to the illustrated points, and may change along with the movement of the tool attacher 210.

Here, the planar relative motion between the tool attacher 210 and the work attacher 220 is measured by capturing the points 321, 322, and 323 on the XY-plane. However, a spatial relative motion can be measured by, for example, capturing at least two planes of the XY-plane, the XZ-plane, and the YZ-plane using the three cameras 311, 312, and 313.

That is, based on the image capturing result on at least two planes of the XY-plane, the XZ-plane, and the YZ-plane, the calculator 303 calculates a value indicating the relative motion on the at least two planes of the XY-plane, the XZ-plane, and the YZ-plane between the tool attacher 210 and the work attacher 220. This allows the measuring apparatus 200 to measure the spatial accuracy (pitch (rotation angle about the X-axis)/roll (rotation angle about the Y-axis)/yaw (rotation angle about the Z-axis), and the like) between the tool attacher 210 and the work attacher 220.

According to this example embodiment, since image capturing is performed, using three cameras, at three positions any one of which is not located on a line that passes through the remaining two positions, the planar relative motion between the tool attacher and the work attacher can be measured accurately in a short time.

Third Example Embodiment

Figure 5:
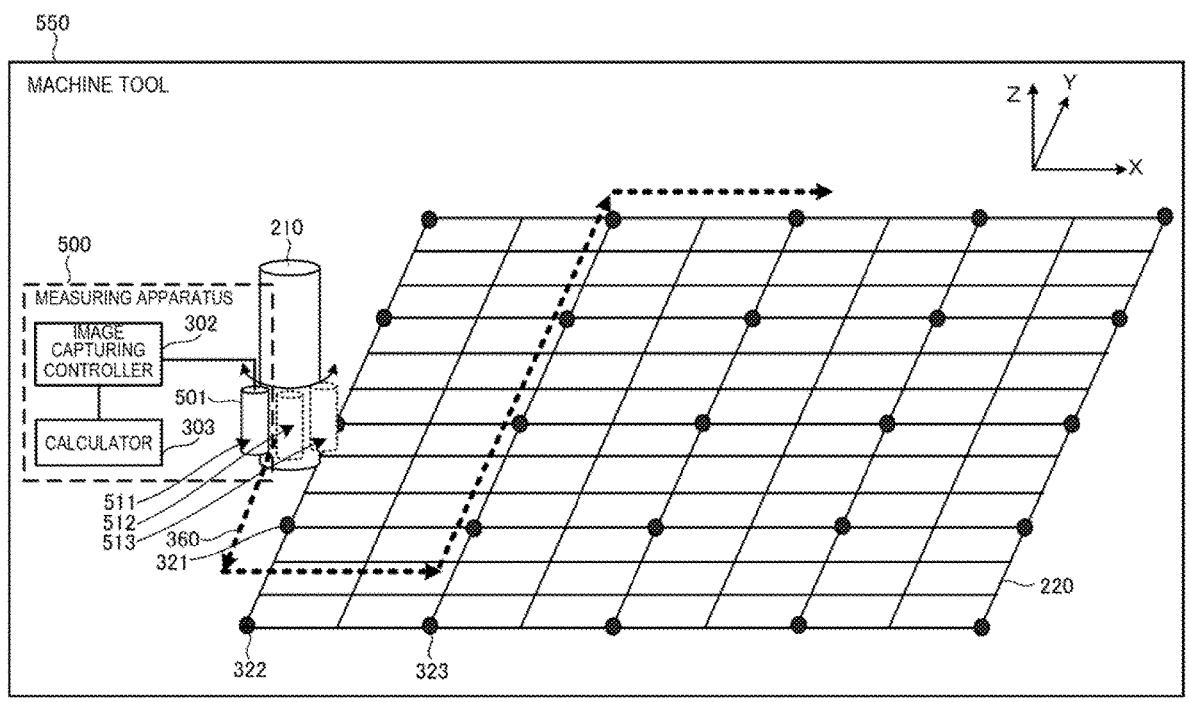
FIG. 5 is a block diagram for explaining the configuration of a measuring apparatus according to the third example embodiment of the present invention.

A measuring apparatus according to the third example embodiment of the present invention will be described next with reference to FIG. 5. FIG. 5 is a view for explaining the configuration of the measuring apparatus according to this example embodiment. The measuring apparatus according to this example embodiment is different from the second example embodiment in that one camera is used. The rest of the components and operations is the same as in the second example embodiment. Hence, the same reference numerals denote the same components and operations, and a detailed description thereof will be omitted.

A measuring apparatus 500 includes one camera 501 as at least one image capturing element. The camera 501 can move to a first position 511, a second position 512, and a third position 513. That is, the camera 501 can move to the first position 511, the second position 512, and the third position 513 by moving along the periphery of a tool attacher 210 of a machine tool 550. An image capturing controller 302 controls the camera 501 to capture points 321, 322, and 323.

According to this example embodiment, since image capturing is performed, using one camera, at three positions any one of which is not located on a line that passes through the remaining two positions, the planar relative motion between the tool attacher and the work attacher can be measured accurately at low cost.

Fourth Example Embodiment

Figure 6:
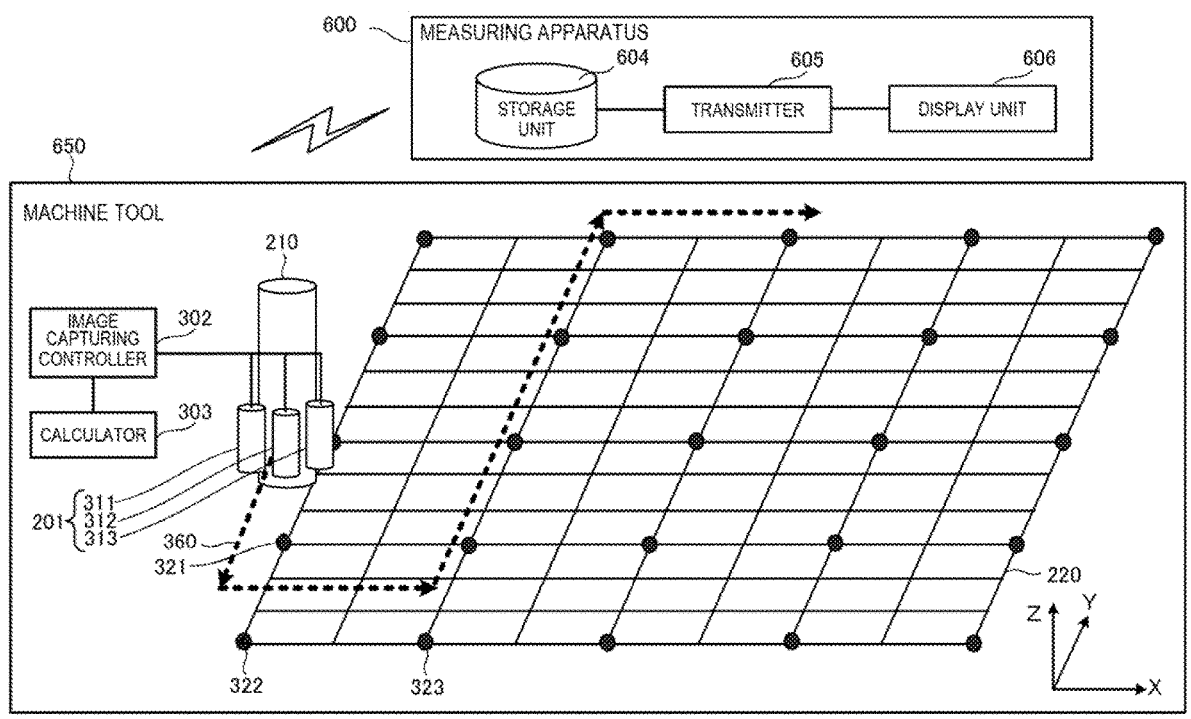
FIG. 6 is a block diagram for explaining the configuration of a measuring apparatus according to the fourth example embodiment of the present invention.

A measuring apparatus according to the fourth example embodiment of the present invention will be described next with reference to FIG. 6. FIG. 6 is a view for explaining the configuration of the measuring apparatus according to this example embodiment. The measuring apparatus according to this example embodiment is different from the second example embodiment in that a machine tool includes an image capturing controller and a calculator, the measuring apparatus includes a storage unit, a transmitter, and a display unit, and the measuring apparatus is located outside the machine tool. The rest of the components and operations is the same as in the second example embodiment. Hence, the same reference numerals denote the same components and operations, and a detailed description thereof will be omitted.

A measuring apparatus 600 includes a storage unit 604, a transmitter 605, and a display unit 606. The storage unit 604 stores various measuring programs according to the types of machine tools, the types of tools, the types of works, and the like. The transmitter 605 transmits a measuring program to a machine tool 650. The machine tool 650 receives, by a receiver (not shown), the measuring program transmitted from the measuring apparatus 600. The measuring program is a program that describes, for example, control by the image capturing controller 302 of the machine tool 650, and includes the image capturing timing and the image capturing position of an image capturer 201, and the moving path and the moving speed of a tool attacher 210. The image capturing controller 302 of the machine tool 650 performs image capturing by controlling the image capturer 201 and the like in accordance with the received measuring program, and the calculator 303 calculates a value indicating the planar relative motion between the tool attacher 210 and a work attacher 220. The calculation result is transmitted to the measuring apparatus 600. The measuring apparatus 600 receives the value calculated by the calculator 303, and the display unit 606 displays the received calculated value.

According to this example embodiment, since the measuring program is transmitted to the machine tool, even if the measuring apparatus and the machine tool are different apparatuses, the planar relative motion between the tool attacher and the work attacher can be measured.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A measuring apparatus for measuring a planar relative motion between a tool attacher and a work attacher of a machine tool, comprising:
    an image capturer that includes at least one image capturing element capable of performing image capturing at a first position, a second position, and a third position, which are not located on the same line, in a state in which said image capturer is attached to one of the tool attacher and the work attacher, any one of the first position, the second position, and the third position being not located on a line that passes through remaining two;
    an image capturing controller that causes the image capturing elements at the first position, the second position, and the third position to capture a first point, a second point, and a third point, respectively, arranged on at least one plane of an XY-plane, an XZ-plane, and a YZ-plane without changing a relative position of one of the tool attacher and the work attacher to which said image capturer is attached, and
    changes the relative position of one of the tool attacher and the work attacher, causes the image capturing element at the second position and the image capturing element at the third position to capture the first point, causes the image capturing element at the first position and the image capturing element at the third position to capture the second point, and causes the image capturing element at the first position and the image capturing element at the second position to capture the third point; and
    a calculator that calculates a value indicating the planar relative motion between the tool attacher and the work attacher based on an image capturing result of said image capturer.

2. The measuring apparatus according to claim 1, wherein said image capturer comprises three cameras as the at least one image capturing element.

3. The measuring apparatus according to claim 1, wherein the first position, the second position, and the third position are three positions arranged in an L-shaped pattern.

4. The measuring apparatus according to claim 1, wherein said image capturer comprises one camera capable of moving to the first position, the second position, and the third position as the at least one image capturing element.

5. The measuring apparatus according to claim 1, further comprising a grid representing the first point, the second point, and the third point.

6. The measuring apparatus according to claim 1, wherein said image capturing controller causes the image capturing element to capture at least two planes of the XY-plane, the XZ-plane, and the YZ-plane, and
    said calculator calculates a value indicating the relative motion on the at least two planes between the tool attacher and the work attacher based on the image capturing result of said image capturer on the at least two planes of the XY-plane, the XZ-plane, and the YZ-plane.

7. A measuring apparatus for measuring a planar relative motion between a tool attacher and a work attacher of a machine tool including:
    the tool attacher to which a tool is attached;
    the work attacher to which a work is attached;
    an image capturer that includes at least one image capturing element capable of performing image capturing at a first position, a second position, and a third position any one of which is not located on a line that passes through remaining two in a state in which said image capturer is attached to one of the tool attacher and the work attacher;

an image capturing controller that causes, in accordance with a measuring program, the image capturing elements at the first position, the second position, and the third position to capture a first point, a second point, and a third point, respectively, arranged on at least one plane of an XY-plane, an XZ-plane, and a YZ-plane without changing a relative position of one of the tool attacher and the work attacher to which said image capturer is attached, changes the relative position of one of the tool attacher and the work attacher, causes the image capturing element at the second position and the image capturing element at the third position to capture the first point, causes the image capturing element at the first position and the image capturing element at the third position to capture the second point, and causes the image capturing element at the first position and the image capturing element at the second position to capture the third point; and a calculator that calculates a value indicating the planar relative motion between the tool attacher and the work attacher based on an image capturing result of said image capturer, the measuring apparatus comprising:

a storage unit that stores the measuring program;

a transmitter that transmits the measuring program to the machine tool; and a display unit that displays the value calculated by said calculator.

* * * * *